Nov. 11, 1947.　　　　A. R. STONE　　　　2,430,789
AUTOMOTIVE VEHICLE CONTROL
Filed Dec. 20, 1945　　　　2 Sheets-Sheet 2
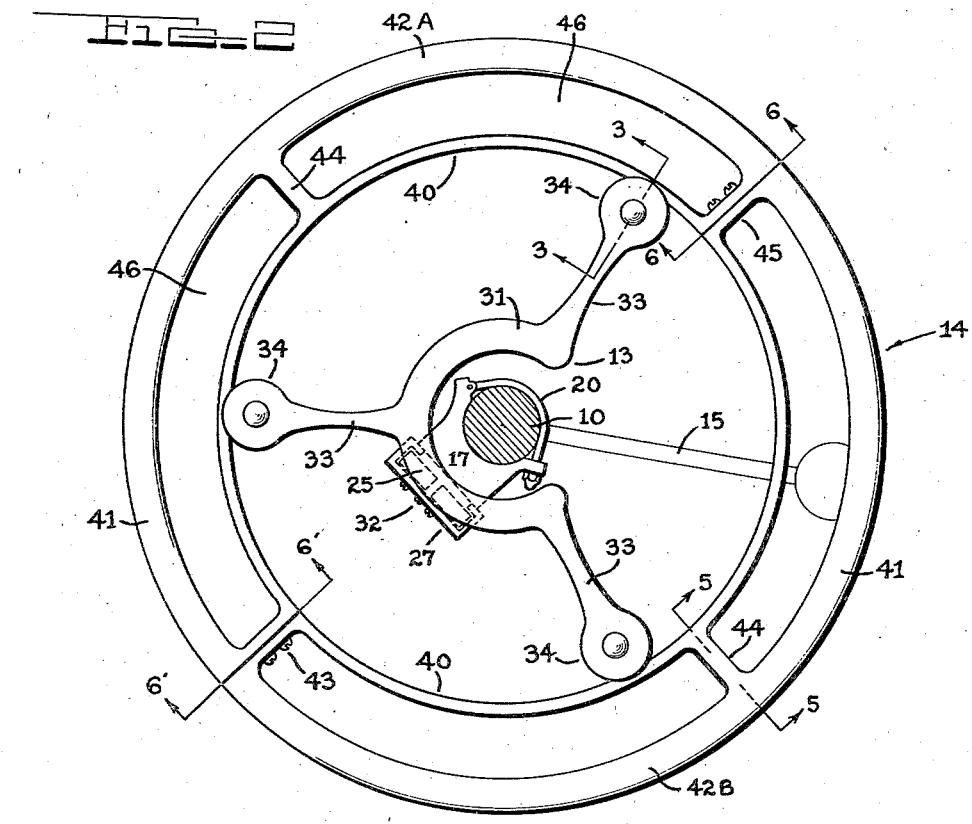
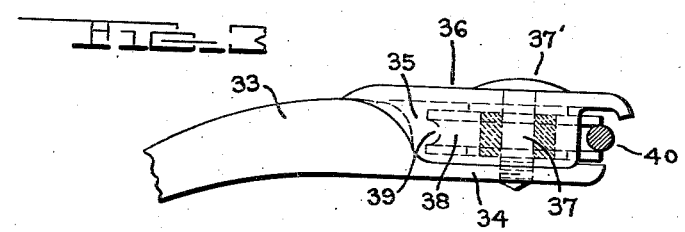
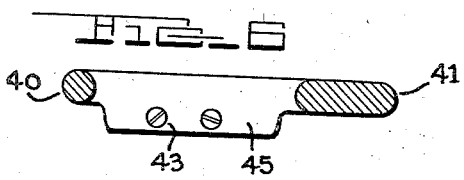
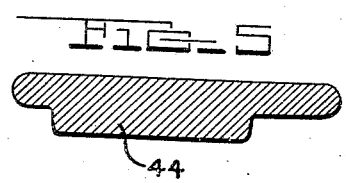
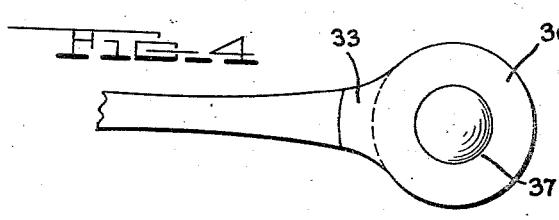
INVENTOR
ALBERT RIVINGTON STONE
BY
HIS ATTORNEY Patented Nov. 11, 1947

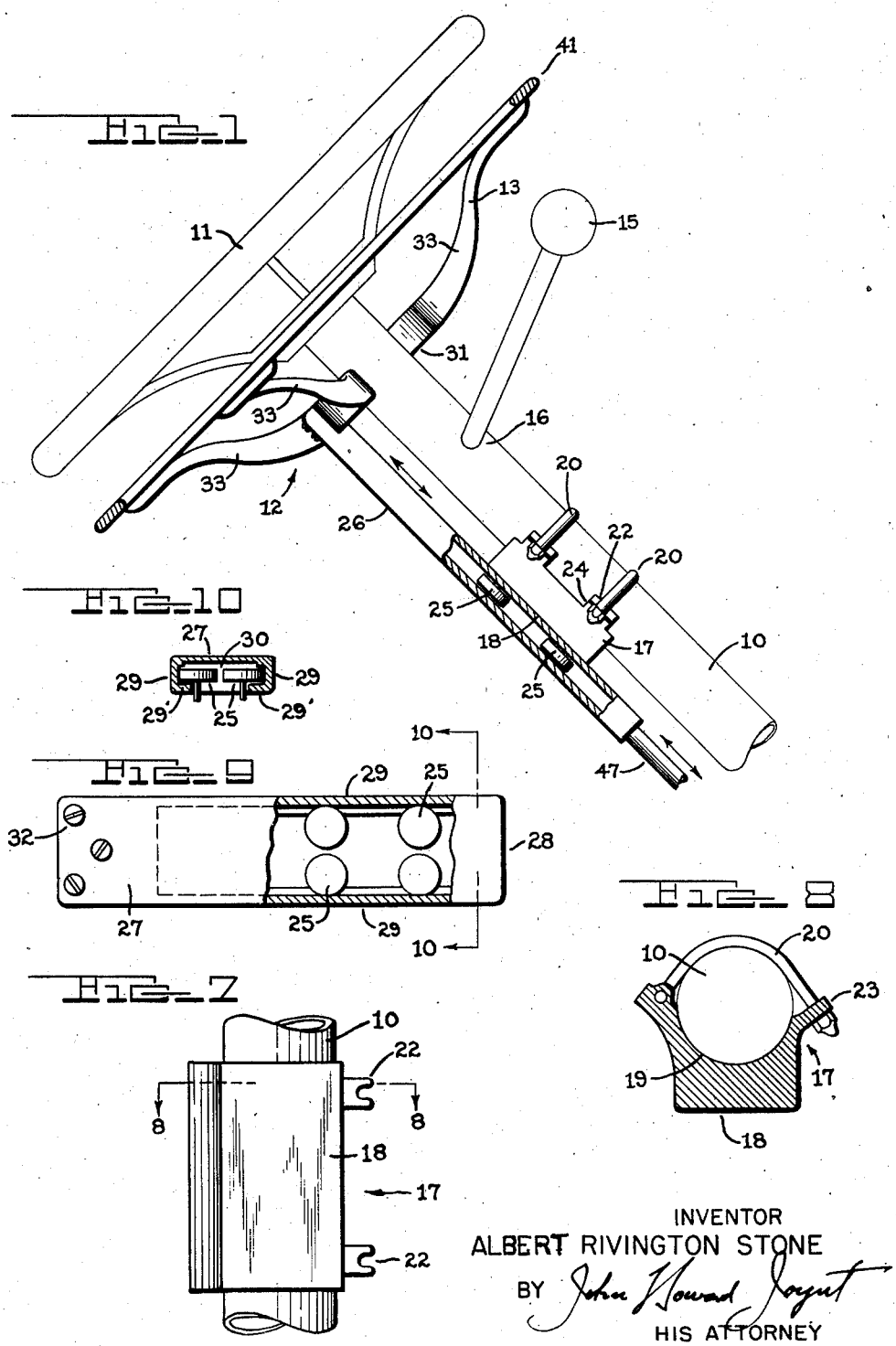

2,430,789

UNITED STATES PATENT OFFICE 2,430,789

AUTOMOTIVE VEHICLE CONTROL

Albert Rivington Stone, Baltimore, Md., assignor to Carpenter-Stone, Inc., West Point, Ga., a corporation of Georgia Application December 20, 1945, Serial No. 636,190

9 Claims. (Cl. 74—486)

1

My invention relates to control means for automotive conveyances, and particularly relates to such control means as are applicable to the steering columns of automobile and like vehicles, to facilitate their operation by persons laboring under physical handicaps.

Among the objects of my invention is to provide an automobile control means capable of operation by physically handicapped persons without removal of the hands from the steering wheel, which is simple, compact, sturdy, reliable, easy and sure in operation, involving a minimum number of movable parts and these all of substantial construction and having a high degree of reliability under all operating conditions, which is readily incorporated in new vehicles or easily mounted on automobiles or similar conveyances already in existence, and which permits a high degree of safety in operation, approaching that attainable when the operator is physically sound.

Other objects and advantages in part will be obvious and in part pointed out hereinafter during the course of the following description, taken in the light of the accompanying drawings.

My invention accordingly resides in the several elements, features of construction and arrangement of parts, and in the association of each of the same with one or more of the others, the scope of the application of all of which is more fully pointed out in the claims at the end of this specification.

Now having reference more particularly to the several views of the drawings wherein I illustrate that embodiment of my invention which I prefer at present, Fig. 1 is a side elevation showing the details of my invention as applied to the steering column of the ordinary automobile;

Fig. 2 is a top plan view of the assembly according to Fig. 1;

Fig. 3 is an enlarged sectional detail taken on the line 3—3 of Fig. 2 and illustrates constructional details of the outer portion of the spider and the control wheel rim;

Fig. 4 is a top plan view on the same scale as and showing certain portions of the constructional details according to Fig. 1;

Figs. 5 and 6 are a sectional and an end elevation respectively, taken on the lines 5—5 and 6—6 of Fig. 2;

Figs. 7 and 8 are an elevation, and a sectional view, respectively, showing details of the mounting bracket which is illustrated in assembled relation in Figs. 1, 2, Fig. 8 being taken on the line 8—8 of Fig. 7; while,

2

Figs. 9 and 10 are a side elevation of the contact wheel slide shown in Fig. 1 and a transverse sectional view taken on the line 10—10 of Fig. 9.

Throughout the drawings like reference characters indicate like parts.

To permit more ready and thorough appreciation of my invention it is interesting to note at this point that much attention has been given from time to time to the development of control mechanisms of automotive vehicles and conveyances of all sorts. To illustrate, while the present invention has particular application to automobiles, trucks, and other road vehicles, it likewise has further important application to conveyances such as motor boats and the like.

The control means for conveyances of this general type over a development period of some three or four decades have been brought to an extremely high degree of refinement. Thus, by the trained and skillful use and manipulation of the hands and feet of the operator, smooth, sensitive control of the vehicle is insured under almost all operating conditions. In all important respects, this operation is satisfactory. Smooth, rapid acceleration is possible; fuel can be throttled in highly sensitive manner; steering is easily accomplished; and braking action is gentle and smooth. In substantial measure, therefore, driving has been reduced to a matter of great pleasure for the physically sound driver, as well as substantial safety.

Nothing comparable with this degree of development, however, has been achieved for the person who is physically handicapped. By "physically handicapped" I describe one who in some manner or the other has lost the use of one or more of his limbs, or who, because of some impairment, is unable to transmit through the trunk of his body signals demanding important muscular response from his lower limbs. Such persons heretofore have either been denied in large measure the pleasures and field of economic gain opened up in general by automotive equipment, or else constitute a distinct hazard to the other persons confronting the path of the conveyance under his control. Thus, from a practical standpoint and as applied to the control of automotive equipment, the physically handicapped persons heretofore referred to, constituting a group, constitutes as well, a distinct economic deficiency.

It cannot truthfully be said that the problem of the handicapped driver has not received considerable attention from the workers in the art, and this over a period of years. On the contrary, much attention has been given, for humanitarian as well as for other reasons, to this important question. For one reason or another, however, the various proposals heretofore forthcoming have been singularly and uniformly unsuccessful, and have fallen far short of their objectives. Complexity, unreliability, high first costs, difficulty in installing in equipment already in existence, difficulty and complexity in operation, rapid wear among large numbers of moving parts, are but a few among many reasons, standing either alone or in various aggregations, explaining at least in part why the suggestions and proposals heretofore made have proven unavailable.

An important objective of my invention, therefore, is to provide a simplified control assembly which while readily installed either in new equipment or in conveyances already in existence, is entirely reliable, sturdy, simple in construction and in operation, of small space requirement, easy to service and repair when maintenance is required and which because of its small number of moving parts has long useful life.

An important prerequisite of control apparatus for operation by handicapped persons is that substantially all control action be exerted by the hands of the operator. Since in almost every instance the dirigibility of such equipment is dependent upon hand steering by the operator, it is a further prerequisite that such control can be achieved without any appreciable effect on the facility with which the operator can steer the vehicle. Translated into other terms, this means simply that the control mechanism must be located close to the steering wheel and operable in ready and reliable manner without interfering with its operation.

The control hereinbefore referred to can apply to any one or more of a number of different parts of the automotive conveyance. For example, it may apply to a throttle valve, to a brake, a clutch, headlights, or to any one or more of a number of similar important parts of the motor vehicle. Thus, to illustrate, control of the radio may be achieved by the use of electrical or mechanical relay switches, the control action may be selectively applied to one or more of the several items for which control is desired. Similar control can be achieved by one or more multi-throw hydraulic valves.

The present invention, as has been suggested hereinbefore, relates to the actuating mechanism for the controls, regardless of what form the particular control may assume. This control is mounted on the steering column, so that the entire car may be manipulated by the handicapped person through the use of his hands alone. In this connection, it is desirable that the control means be nearly always in the grasp of the user. In this manner, reasonable assurance is provided that the driver will always have the car under control even when confronted by emergency conditions. There will be no necessity at such times of fumbling around to bring the control into grasp, inasmuch as it will already be in the hands of the user. At the same time, it is essential that the steering wheel itself be held continuously by the driver. For proper operation of the controls and for optimum results it is necessary that these conditions be simultaneously satisfied.

To this end, I provide a steering column 10 having the conventional steering wheel 11. The control wheel, constituted of central spider 13 and outer control wheel 14, is indicated generally at 12 in Figure 1. The conventional gear shift lever 15 leads into the steering column 10 at any suitable point, here illustrated for convenience at 16. The portion of the steering column 10 visible from the exterior is of course the rigid shell, fast against movement relative to the floor of the conveyance. Fast to this immovable and rigid column 10 I provide a suitable lock and mounting bracket indicated generally at 17. This consists of an elongated metal member conveniently flat across an outer longitudinal surface 18 extending parallel with the steering column 10. Straps 20 are made fast in projections 21 comprising one end of the forward extremity of the section through bracket 17 (see Fig. 8) as by upsetting, brazing, bolting, welding, riveting or the like. These straps, here shown as two in number, engage firmly and snugly about the steering column 10, and immobilizing the bracket 17 thereagainst, have their head ends received in suitable means, here shown as recessed lugs 22, provided on the opposed edge 23 of bracket 17. Suitable means, here illustrated as nuts 24, thread down on the straps 20 and secure them firmly about the steering column 10. It is this bracket 17 which carries the control wheel 12 in such manner that the operable effect of the latter consists solely of longitudinal reciprocation, relative to the steering column 10. No rotary motion of the control wheel is transmitted to the control itself. The manner in which this selective motion is effected will be more fully pointed out hereinafter.

On the outer surface 18 of the bracket 17 are carried a plurality of anti-friction rollers 25 (Figs. 1, 2 and 9). A control wheel slide 26 cooperates with these rollers to carry the control wheel 12 in its longitudinal reciprocation. Thus it serves the dual function of guide and support for the control wheel.

The control slide 26 comprises, in the preferred instance here undergoing description, a rectangular backing 27 of metal or similar suitable material, open at its lower end 28 and folded at its longitudinal sides in U-shaped wings 29, having inturned legs 29' at the front end or face thereof. This provides a recess or slot 30, longitudinal in extent, in which the anti-friction means 25 are snugly housed. The slide 26 is made fast to the central hub 31 of control wheel 12 through any suitable means, here shown as comprising three screws 32 extending through the slide 26 and threaded into the hub 31.

It has been stated hereinbefore that the control wheel slide 26 carries the hub 31 of the inner spider indicated generally at 13 in Fig. 2. This hub 31 encircles the steering column 10 is concentric therewith. Although the hub may be either of one-piece construction or split into two or more parts, and although it may have a continuous, circular contour, I here disclose the same as stamped of a single piece of metal shaped as the segment of a circle and open at one side thereof as shown at 32. Arms 33, here shown as comprising three in number, radiate outwardly at equal spacing from the hub 31, and as shown, are formed integrally therewith. Each arm 33 terminates in an enlarged head portion 34. As disclosed more precisely in Fig. 3, this head portion is recessed at 35, opening on its top surface, and is adapted to be closed by a cover member 36. This cover member 36 has provided therein a stud 37 extending therethrough, and threading or being otherwise secured into the bottom member 34 of the enlarged head. A cap portion 37' provides an enlarged bearing area for the bolt or stud 37 where it overlies the cap portion 36.

Mounted on the stud 37 and adapted to be received within the recess 35 is an anti-friction roller or sheave 38 carried on ball bearings or the like. This roller or sheave 38 is provided with a centrally disposed, peripheral recess 39.

These sheaves, provided one on each arm 33, are adapted to cooperate with a circular track 40 provided interiorly of and forming part of the control wheel rim indicated generally at 14. The track 40 is semi-circular in cross-section, and engages positively in the recess 39 of the sheaves 38. The cap 36 is contoured so that it does not extend into the path of the track 40, the same being true of the bottom extent of element 34. In this manner, recess 35 is of such extent as to provide for ready acceptance of the track 40 into the grooves 39 of the sheaves 38.

Track 40 is integral with but spaced from the outer control wheel rim, indicated in Figs. 1 and 2 generally at 41. It will be seen that since track 40 is received snugly in the recesses 39, it must necessarily be carried thereby and is rotatable relative thereto. Thus the track 40 can rotate about steering column 10 as a center relative to the inner spider 13 in the substantial absence of appreciable friction. Rim 41, therefore, under the effort of the driver, can rotate relative to the spider 13 in substantial conformity with the movements of the overlying steering wheel 11.

To mount the track 40 and the rim 41 so that this assembly will be carried by the spider 13, it is necessary that the control wheel be made of at least two-part construction. For this reason, I provide the control wheel assembly of two parts, 42A and 42B, split along the line 6—6 in Fig. 2 and a similar line 6'—6', diametrically opposed thereto. The two parts of the split control wheel are secured together in any desired suitable manner, as by bolts or the like 43. Reinforcing webs 44 extend between track 40 and rim 41 at points intermediate the split webs 45, 45 to insure that the necessary rigidity is imparted to the control assembly.

The several parts of the assembly having all been described, as well as the relation of all such parts relative to each other, there remains to describe briefly the operation of the control apparatus. No more than a brief description is necessary inasmuch as in substantial measure the mode of operation of the control apparatus is obvious from the detailed description which has preceded this. Briefly, therefore, it can be stated that the operator will place his hands over the steering wheel 11, palms downwardly, and with his thumbs overlying the top of the wheel. His fingers are then extended downwardly and around the outer rim of the control wheel 41.

This latter is conveniently made somewhat flattened, so that it can readily adapt itself to the fingers of the driver, without bulking therein. The tips of the fingers can therefore rest readily in the elongated recesses 46, here shown as four in number, and defined by the cooperating relationship of the track 40, rim 41, intermediate webs 44 and split webs 45. In this manner, both the steering wheel and the control wheel are always gripped in the hands of the operator. At no time is the dirigibility of the conveyance menaced because of necessity of release of the steering controls in order to operate other controls. That is to say, the other control or controls are operated simultaneously and along with the operation of the steering controls. An important feature of my invention, contributing greatly to the safety function, is that the control wheel 41 at all times rotates along with the steering wheel itself.

The relationship of the track 40 in the steering wheel assembly 14 and the anti-friction sheaves 38 on the spider arms 33 insures that the rotational motion of the control wheel is not imparted to the control spider indicated generally at 13. Any such tendency towards rotary motion as might inadvertently be imparted to the spider 13 despite the anti-friction relation of the sheaves 38 and track 40 is effectively resisted by the cooperation between the control wheel slide 26 and the mounting bracket 17, provided on the steering column. The only motion which can be transmitted through the spider 13 to the control 47 (Fig. 1) is a rectilinear motion parallel to the steering column 10. This motion, along a guided path, nicely controlled by the cooperation between bracket 17 and slide 26, is permitted by upward and downward movement of the control wheel 14 relative to steering column 10 under the guidance and impulse of the fingers of the operator.

Control 47 can be utilized for any desired purpose, such as throttle, brakes, clutch or the like. As has been suggested hereinbefore, through the use of intermediary devices such as electrical relays or switches, hydraulic or mechanical means, such as flexible cable, the control can be switched so as to govern the action of one or more separate devices. Moreover, the control may be designed that during one portion of its travel it will control one element of the conveyance mechanism, while during a further portion of its travel, it controls two or more governing devices.

As has also been stated hereinbefore, however, the present invention is directed solely to the control assembly itself and its relationship to the steering wheel and steering column, regardless of the particular vehicle element controlled thereby.

By means of the foregoing construction, it is readily possible for the handicapped person to operate a car with the same high degree of safety as one having full possession of all his limbs, the manipulation of the controls being achieved in simple and ready manner. Moreover, the installation, simple in itself, involving a minimum number of moving parts, is rugged and sturdy. The various component parts are in themselves simple in design and easy of production. Thus long reliable service is insured, while repairs can be accomplished in expeditious manner at low cost, whenever required. The device can be incorporated either in new equipment at a minimum effort or installed in but a moment's time on conveyances already in existence. All these, along with many other thoroughly practical advantages, are achieved according to the practice of my invention.

Inasmuch as many embodiments of my invention will readily occur to those skilled in the art once the broad aspects thereof are disclosed and since many modifications can be achieved of the embodiment illustrated in this specification, it should be understood that the foregoing description is solely by way of illustration and should not be construed as limitative.

I claim:

1. Control apparatus for dirigible conveyance having a steering column and steering wheel comprising means for mounting the control apparatus on and exteriorly of the steering column, control means movable longitudinally of said steering column and carried by and constrained against angular motion by said mounting means, a control wheel underlying said steering wheel comprising a spider and a rim supported by said spider and rotatable with respect thereto and adapted to be gripped and moved together with the steering wheel, and means interconnecting said control wheel with said control means whereby only movement of the control wheel longitudinally of the steering column is imparted to said control means.

2. A control assembly for an automotive vehicle having a steering column and a steering wheel, comprising a mounting bracket fast to said steering column, a spider encircling said steering column and having a control wheel carried thereby, and a slide fast to said spider and cooperating with said mounting bracket to carry the spider on said bracket, said control wheel including a control wheel rim underlying said steering wheel and carried by and rotatable relative to said spider, whereby the control wheel rim can rotate with said steering column and will transmit only longitudinal movement to said spider.

3. As an element of an automobile control assembly, a mounting bracket adapted to be made fast to the outer shell of the steering column and carrying anti-friction rollers thereon, a spider encircling said steering column and having a slide made fast thereon and engaging about and movable relative to said rollers, and a control made fast to said slide.

4. A control wheel assembly for an automotive vehicle having a steering wheel and a steering column, comprising a bracket made fast to the outer shell of the steering column, an inner spider supported thereon and movable longitudinally relative thereto, and an outer wheel carried by said inner spider and rotatable in anti-friction manner relative thereto.

5. A control wheel assembly for an automotive vehicle having a steering wheel and a steering column, comprising a support made fast to the outer shell of the steering column and an inner spider supported thereon and movable longitudinally relative thereto; and an outer wheel carried by said inner spider and having an annular track on its inner surface, the said spider terminating in anti-friction elements carrying and cooperating with said track so that the outer wheel is rotatable in anti-friction manner relative to said inner spider.

6. As an element of control apparatus for automotive vehicles having a steering column and a steering wheel, a control wheel assembly comprising an inner spider mounted for longitudinal movement along said steering column; and an outer wheel carried by, cooperable with and rotatable relative to said inner spider, said outer wheel comprising an inner track and an outer rim spaced therefrom by spacing arms so as to provide curved finger recesses.

7. As an element of control apparatus for automotive vehicles having a steering column and a steering wheel, a control wheel assembly comprising an inner spider mounted for longitudinal movement of said steering column; and an outer wheel carried by, cooperable with and rotatable relative to said inner spider and comprising split segments fastened together, said outer wheel comprising an inner track and an outer rim spaced therefrom by spacing arms so as to provide curved finger recesses.

8. A two-part control assembly for automotive control means adapted for mounting on the steering column of the automobile and comprising an outer wheel part rotatable with the main steering wheel and an inner spider part relative to which the outer part is rotatable and movable only in a direction parallel to the steering column, said spider part having a central hub portion open on one side thereof to fit around said steering column.

9. As an element of a control wheel assembly for an automotive vehicle, a spider having a central hub portion and radial arms extending outwardly therefrom, said arms terminating in a chambered portion having a peripherally grooved sheave mounted therein in anti-friction manner, and an annular member received in and carried by the outer extent of the sheaves mounted in the several arms.

ALBERT RIVINGTON STONE.

REFERENCES CITED

The following references are of record in the file of this patent:

UNITED STATES PATENTS

| Number | Name | Date |
|---|---|---|
| 2,182,658 | Chilton | Dec. 5, 1939 |
| 2,203,852 | Wells | June 11, 1940 |
| 737,399 | Grout | Aug. 25, 1903 |
| 1,161,265 | Stewart | Nov. 23, 1915 |
| 2,200,625 | Koppel | May 14, 1940 |
| 1,519,172 | Stewart | Dec. 16, 1924 |